(12) United States Patent
Niitti

(10) Patent No.: US 6,953,123 B2
(45) Date of Patent: Oct. 11, 2005

(54) PRE-SEPARATION OF FEED MATERIAL FOR HINDERED-BED SEPARATOR

(75) Inventor: Timo U. Niitti, Espoo (FI)

(73) Assignee: Outokumpu Oyj, Espoo (FI)

( * ) Notice: Subject to any disclaimer, the term of this patent is extended or adjusted under 35 U.S.C. 154(b) by 154 days.

(21) Appl. No.: 10/175,573

(22) Filed: Jun. 19, 2002

(65) Prior Publication Data

US 2003/0234227 A1 Dec. 25, 2003

(51) Int. Cl.$^7$ .............................. B04C 3/04; B03B 5/26
(52) U.S. Cl. ....................... 210/388; 210/304; 210/800; 210/806; 210/299; 210/312; 210/512.1; 210/519; 210/532.1; 209/155; 209/158; 209/172; 209/172.5; 209/173; 209/725
(58) Field of Search ................................ 210/788, 800, 210/806, 299, 304, 312, 512.1, 519, 532.1; 209/155, 158, 172, 172.5, 173, 725

(56) References Cited

U.S. PATENT DOCUMENTS

| | | | |
|---|---|---|---|
| 4,301,001 A | * | 11/1981 | Lofthouse .................... 209/17 |
| 4,539,103 A | * | 9/1985 | Hollingsworth ............. 209/158 |
| 4,807,761 A | | 2/1989 | Hollingsworth |
| 5,391,294 A | * | 2/1995 | Mercier ....................... 210/151 |
| 6,264,040 B1 | | 7/2001 | Mankosa |

OTHER PUBLICATIONS

Physical Separation Processing, Proceedings of the XXI International Mineral Processing Congress—In–Plant Testing of the Hydrofloat Separator, pp. A7–69 to A7–77.

Physical Separation Processing, Proceedings of the XXI International Mineral Processing Congress—In–Plant Testing of the Hydrofloat Separator, pp. A7–69 to A7–77, Jul. 23–27, 2000.

* cited by examiner

Primary Examiner—W. L. Walker
Assistant Examiner—K S Menon
(74) Attorney, Agent, or Firm—Arthur G. Yeager

(57) ABSTRACT

A pre-separator feed well for use with hydrous slurry feed is provided in a hindered-bed separator that includes an elongate body defining an interior space with upper and lower portions. The feed well is elongate and includes a vertically adjustable conical plate adjacent the bottom thereof for control of downward flow of heavy material. The top of the feed well includes an overflow weir including an overflow ring having a plurality of vertical slots through which flows the lighter material onto an overflow weir adjacent an overflow launder and to an outlet pipe. Feed is introduced into the upper portion of the feed well in a tangential manner. A perforated barrier may be mounted below the feed well in some circumstances. Teeter flow is introduced in a lower portion of the separator and flows upwardly. Alternatively, the lower part of the separator can be perforated for heavy/coarse material discharge.

20 Claims, 3 Drawing Sheets

PRE-SEPARATION OF FEED MATERIAL FOR HINDERED-BED SEPARATOR

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to the use of a separator to partition solid particles in a hydrous slurry or pulp into two or more fractions containing particles of different size and density and particularly to pre-separation methods and apparatus.

2. Relevant Art

Many sizing and classifying methods employ gravity of solid material in a hydrous slurry with an incoming feed containing the material encountering an upward water flow. The variation in size and/or density will result in heavier particles falling to a lower level and lighter particles being uplifted to an overflow level thus affecting the desired separation.

What is desired in such separator technology is the prevention of excessive turbulence that "short circuits" incoming feed into the overflow level. Also desired is a pre-separator to function as a preclassifier for greater control of the density differences of the upper and lower levels to provide for improved separation.

BRIEF SUMMARY OF THE INVENTION

In one aspect of the invention there is provided apparatus for the pre-separation of hydrous slurry feed in a hindered-bed separator comprising a hindered-bed separator for classifying feed material in a hydrous slurry feed having an elongated body with an upper part, a middle part and a lower part and a top and bottom defining and interior space with upper, middle and lower portion, the separator including an overflow launder adjacent the top of the body, a plate having spaced perforations therethrough may be mounted in the interior space of the body generally in the middle portion between the upper and lower portions of the interior space. A teeter water distributor is used to introduce teeter water into the lower portion of the interior space and to direct water therefrom upwardly through the perforations of the plate. An elongated feed well is used for pre-classifying feed material entering the separator, the feed well including a housing having an upper portion and a lower portion defining an interior space and a top portion and a bottom portion, means for mounting the housing in the upper portion of the interior space of the body. An overflow weir is mounted adjacent the top portion of the housing adjacent the overflow launder, and a slurry introducer is included for directing a hydrous slurry feed into the upper portion of the interior space of the feed well. The overflow weir includes an overflow ring body and a plurality of spaced upstanding walls separated by a plurality of spaced slots. The slots are V-shaped with a downwardly disposed apex, and the walls are V-shaped with an upwardly disposed apex. Alternately, the slots and the walls are substantially rectangular in shape. Also included is a cap portion rotatably mounted to the overflow ring body, the cap portion including a plurality of downwardly subtending alternating walls and slots aligned with the walls and slots of the overflow ring body, the cap portion being rotated to adjust flow from the top portion to the overflow launder. There is a flow control plate located adjacent the open bottom of the feed well for controlling flow through the bottom, and means for movably mounting the flow control plate, the means for movably mounting including means for selectively moving the flow control plate vertically with respect to the bottom of said feed well. The flow control plate is either flat or conical in shape. The means for movably mounting the flow control plate is a threaded rod connected between the flow control plate and the overflow launder.

In another aspect of the present invention, there is provided apparatus for the pre-separation of hydrous slurry feed in a hindered-bed separator comprising a hindered-bed separator for classifying feed material in a hydrous slurry feed having an elongated body with an upper part, a middle part, and a lower part and a top and bottom defining an interior space with upper, middle, and lower portion, the separator including an overflow launder adjacent the top of the body and a overflow weir adjacent the overflow launder providing flow to the overflow launder. A plate having spaced perforations therethrough may be mounted in the interior space of the body generally in the middle portion between the upper and lower portions of the interior space and a teeter water distributor preferably mounted below the plate is used to introduce teeter water into the lower portion of the interior space and directing water therefrom upwardly through the perforations of the plate. An elongated feed well is included for pre-classifying feed material entering the separator, the feed well includes a housing having an upper portion and a lower portion defining an interior space and a top portion and a bottom portion, means for mounting the housing in the upper portion of the interior space of the body, an overflow weir is mounted adjacent the top portion of the housing adjacent the overflow launder for directing flow through the open top portion into the overflow launder. There is also a slurry introducer for tangentially directing a hydrous slurry feed into the upper portion of the interior space of the feed well. The overflow weir includes an overflow ring body and a plurality of spaced upstanding walls alternating with a plurality of spaced slots. The slots are V-shaped with a downwardly disposed apex, the walls being V-shaped with an upwardly disposed apex. The slots and the walls may also be substantially rectangular in shape. Flow control means rotatably mounted to the overflow ring body is also included. A flow control plate is located adjacent the open bottom of the feed well for controlling flow through the bottom, and means for movably mounting the flow control plate, the means for movably mounting including means for selectively moving the flow control plate vertically with respect to the bottom of said feed well. The flow control plate is conical in shape and the means for movably mounting the flow control plate is a threaded rod connected between the flow control plate and the overflow launder.

In a further aspect of the present invention there is provided a method for separating particles in a hydrous slurry feed comprising the steps of providing a teeter water feed hindered-bed separator for classifying feed material in a hydrous slurry feed; providing a feed well in the upper portion of the hindered-bed separator for pre-separation of the feed; and introducing the flow of feed into the feed well tangential to the flow of the teeter feed.

Additional steps include providing an overflow weir at the top of the feed well to minimize turbulence in the overflow outlet from the feed well; providing an overflow ring having a body including an alternating series of upstanding spaced walls and slots mounted thereon; and providing V-shaped slots with the apex thereof disposed downwardly adjacent the body of the overflow ring.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE INVENTION

Introduction

Figure 1:
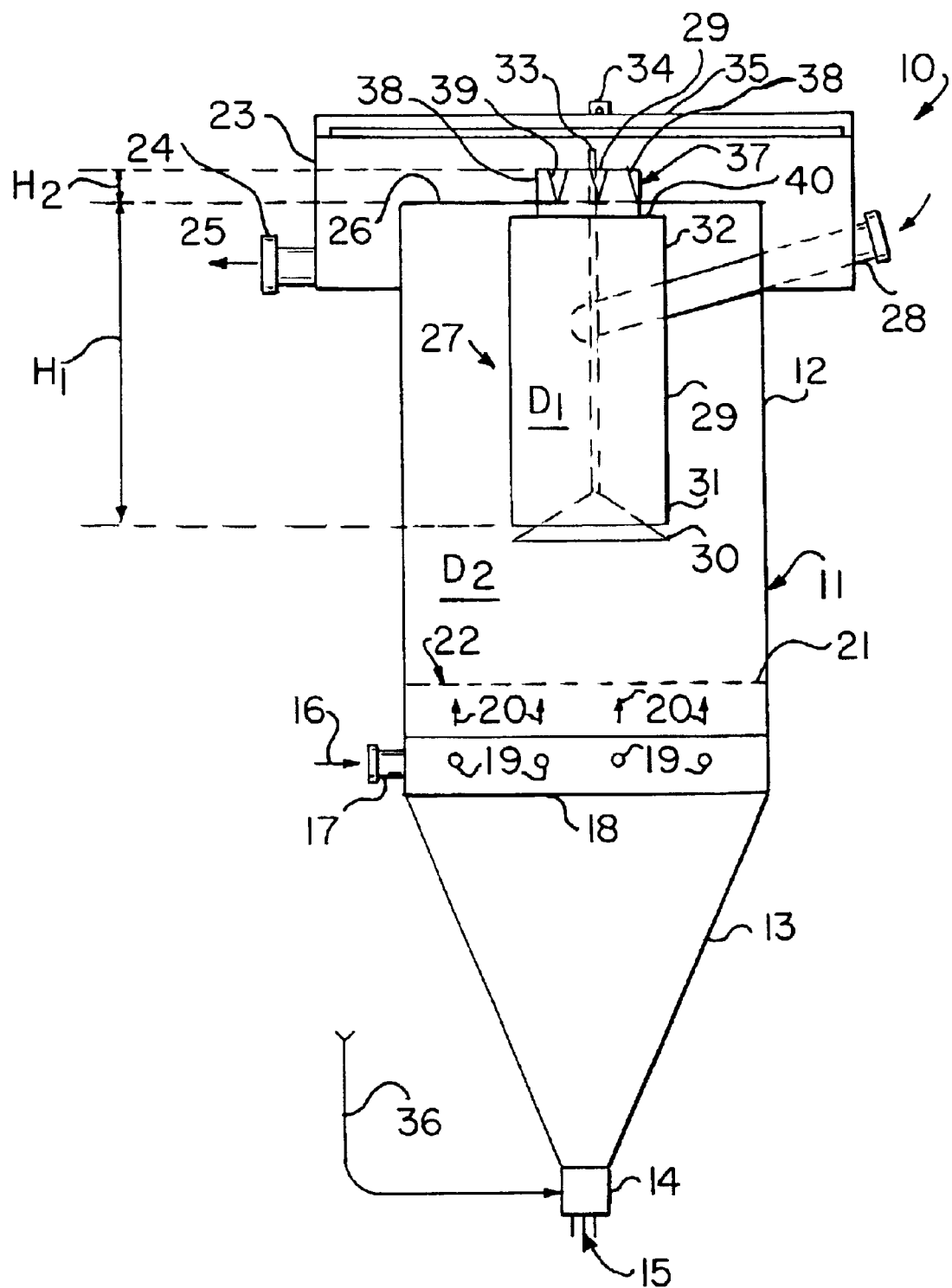
FIG. 1 is a side elevation pictorial view of the separator and pre-separator combination in accord with the present invention.

A hindered-bed separator consists of a vessel defining a chamber having a plurality of feed points for even water distribution a lower portion of the chamber that direct the water flow initially downwardly. Feed is usually introduced into a separate feed well at the top of the chamber. In the feed well all the material flows downward until it is discharged into the main chamber at a desired level. In the chamber heavy, faster settling particles move downwardly and are removed through a coarse feed outlet by various means, e.g., through a conical part (a funnel) and a valve. The rising water carries light particles upward over the top of the vessel into an overflow launder.

By restricting the rate at which coarse, heavier particles are removed from the separator, a high density bed of coarse/heavy particles—a "teeter bed"—can be maintained which restricts the passage of fine/light particles therethrough. By adjusting the input flow, a "teeter zone" is created which, under relatively stable conditions, can result in a high efficiency of separation.

Most conventional teeter-bed separators utilize a feed injection system (well) that discharges vertically downwardly into the upper or middle portion of the chamber as described above or, alternatively, a horizontal input at the top of the unit is used with a weir and baffles to reduce turbulence in the upper part of the chamber (U.S. Pat. No. 6,264,040). This latter approach has a disadvantage in that the incoming feed mixes with the slurry close to the surface and the overflow launder which obviously increases the risk of short circuiting of unwanted material into the overflow product.

Traditionally in a hindered settler the feed well only has one task: distribute the entire feed material evenly into the processing chamber of the settler at a certain intermediate elevation. This means that all the water and all sizes of solids that are present in the feed will enter this zone.

The present invention uses the feed well as a preclassifier and at the same time as a controlling device for the density of the teeter bed by feeding a large portion of the water and finest solids close to the surface of the settler. Only the coarser/heavier minerals enter the lower part of the chamber. This way both the fine/light and coarse/heavy particles are introduced into the chamber close to their specific discharging points and so the possibility of short-circuiting is minimized.

Generally the density of the teetering bed in a hintered settler is about 40–45% solids by volume and the feed is of the order 15% or less by volume. Because the slurry (teetering bed) in the chamber is heavier than the feed slurry, the surface level of the slurry inside the feed well is above the slurry level in the settler itself. This is obvious based on the following simple calculation: Let $D_1$, be the density in feed, $D_2$ be the density of the teeter bed in the main tank. Let $H_1$, be the distance from the bottom of the feed well to the level of the slurry in the main unit and $H_2$ be the distance from that surface to the surface of slurry in the feed well. Because the two vessels are interconnected then $D_1(H_1+H_2)=D_2H_1$. This means that if the upper edge of the feed well is adjusted to a proper height the feed well will overflow from the top. Naturally this overflow is mostly water and some fine solids.

In such a situation if the feed pipe into the feed well is located about halfway to the bottom, the feed well can be used as a presettler; the coarse and heavy minerals will discharge to the main settler chamber from the bottom as relatively high density slurry and the fine and light minerals will overflow the feed well with most of the water close to the surface of the settler. By directing the flow into the feed well tangentially preferably through an elongated slot as in cyclones, the slurry will start rotating in the feed well and the centrifugal force will enhance pre-settling. In other words, the feed well works as a cyclone and thus can be designed either to be cylindrical or conical. The rotation of the slurry in the feed well could also be enhanced by tangential high-pressure water jets or by appropriate mechanical means.

The overflow from the feed well requires special attention. If the overflow lip of the well were a conventional straight lip, the amount of overflow would fluctuate a lot depending on the ratio of pulp density outside and inside of the feed well. In an extreme case almost all the slurry could overflow. The same is true for a no flow situation. Such a feed well should be continuously (automatic) vertically controllable which can be very complicated. This can be avoided by arranging the overflow trough in essentially vertical slots, straight or tapered thus resulting in an overflow that is continuous.

The feed well acts as a controller for the density of the teeter bed. It also dampers the effect of fluctuations in the feed density. The feed well works in the following way in different situations.

1. If the volume of feed is moderately changing (increasing or decreasing) the effect on the operation of the feed well is negligible provided that the bottom opening of the feed well is correctly adjusted and does not restrict the flow. If the change is big, say 50% or more then there will be a change, but this is not a normal operating condition.
2. If the pulp density of the feed is decreasing, then the density inside the feed well decreases and because of that the level ($H_2$) will raise. More water will overflow through the slots in the upper rim. This will wholly or partly balance the situation so that the properties of the slurry fed into the main unit (chamber) will remain more or less constant. This balancing feature can be fine tuned by the shape and depth of the overflow slots.

3. The opposite will happen if the pulp density of the feed increases. As a consequence the pulp level in the feed well will become lower and less water will overflow. As a consequence the properties of the slurry entering into the main unit remain about constant.

The principal feature in the design is the selection of the correct shape and size of the slots for overflow material. Slots that are too wide allow a lot of water to overflow, which may result in a situation that the flow for coarse feed material will slow down due to lack of pressure. Very narrow slots may limit the flow of water too much. Alternately, the operation can be controlled by moving the feed well or just the overflow ring vertically, which is complicated. The other way is to turn a slotted cap inside the slotted overflow opening and adjusting the width of the slots to an optimum for each case. The third way, which is preferred, is to use tapered slots that will control the amount of overflow in an optimum way.

In order to minimize the possible disturbing turbulence at the surface it may be necessary to install a horizontal collar around the top part of the feed well or to make the diameter of the overflow pipe smaller than that of the feed well. The overflowing water will then first hit the collar or roof or shoulder of the feed well and be reflected almost horizontally instead of a vertical fall through the surface into the upper parts of the teetering bed. This guarantees the minimum disturbance of the teetering bed.

With respect now to the drawings, a separator is shown generally at 10 in FIG. 1. Separator 10 has a body 11, either circular or rectangular, with an upper portion 12 and a lower portion 13 that terminates in an outlet valve 14 through which coarse feed flows as indicated by arrow 15.

Teeter water inflow 16 enters intake pipe 17 and flows into manifold 18. From the manifold 18 the water flows into teeter water pipes 19 and from there the water is discharged through small holes, which can point in different directions as desired in the circumstances. The resultant flow is in general shown taking an upward direction as shown by arrows 20, because only very small amounts of water will be discharged with coarse/heavy material through valve 14. In some cases a perforated barrier plate 21 having openings 22 and mounted above pipes 19 is used for more even water distribution.

Water and fine material, known as launder flow 25, exits through outlet pipe 24 from overflow launder 23. The top of separator 10 includes a circular or rectangular overflow weir 26 (depending upon the design of the separator 10) from which flow is directed to overflow launder 23.

Feed well 27 is mounted inside the upper portion 12 of separator 10 and receives an input downwardly in feed well 27 via inlet pipe 28. The feed well 27 has an upper portion 32 and lower portion 31 and body 29. Pipe 28 provides an input generally between portions 31 and 32. A conical or flat flow control plate 30 is hung, for example, from threaded rod 33 which is connected to an operating means 34 mounted to support bar 35 connected to overflow launder 23. Plate 30 and portion 31 are movable vertically via rotation of rod 33 by operating means 34 to control the flow of coarse material downwardly. Plate 30 can also be perforated for pulp discharge if desired. In some cases plate 30 is replaced by a perforated bottom part of feed well 27 and slurry feed enters the chamber through the holes in the bottom part.

Figure 4:
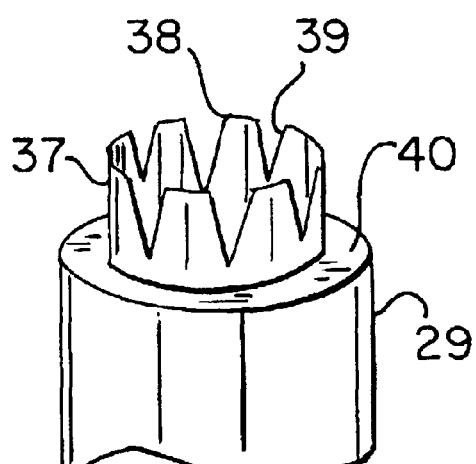

The overflow weir includes an overflow ring body 37 (also shown in FIG. 4) having an overflow lip 40 and upstanding V-shaped walls 38 with an upwardly disposed apex separated via V-shaped slots 39 having a downwardly disposed apex. Lip 40 is preferably slightly below the plane of the overflow weir surface 26 by one or two inches.

Figure 2:
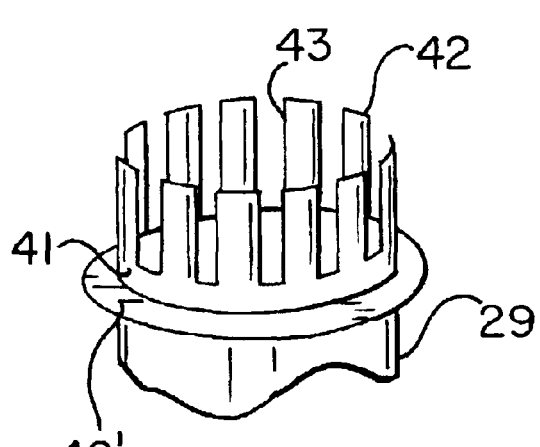
FIGS. 2–5 are pictorial diagrams of feed well overflow arrangements in accord with the present invention.

FIG. 2 illustrates an alternate overflow ring body 41 that is formed by upstanding walls 42 and slots 43 formed integrally with feed well body 29. A circular plate 42' can be installed slightly below the slots 43 (as shown) if desired.

Figure 3:
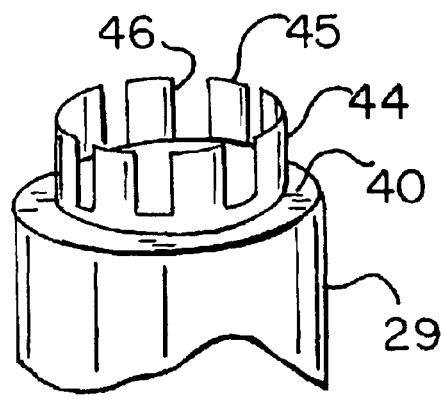

FIG. 3 illustrates another overflow ring body 44 having upstanding walls 45 and slots 46 by which overflow runs onto overflow lip 40.

Figure 5:
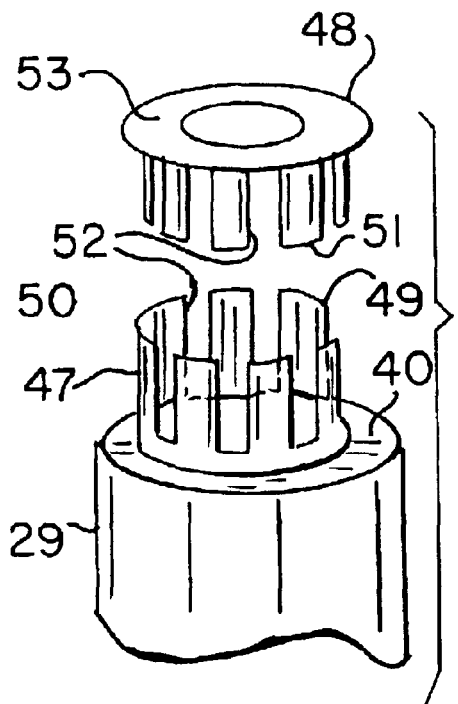

FIG. 5 illustrates another overflow ring body 47 having upstanding walls 49 and slots 50. A rotatable cap 48 has subtending walls 51 and slots 52 and upper surface 53. Cap 48 is sized to fit walls 51 inside walls 50. As understood in the art, rotation of cap 48 will adjust the amount of flow outward onto lip 40.

The number of walls and slots in each overflow ring body of FIGS. 1–5 are variable depending upon the type of feed that is being processed in separator 10.

Figure 6:
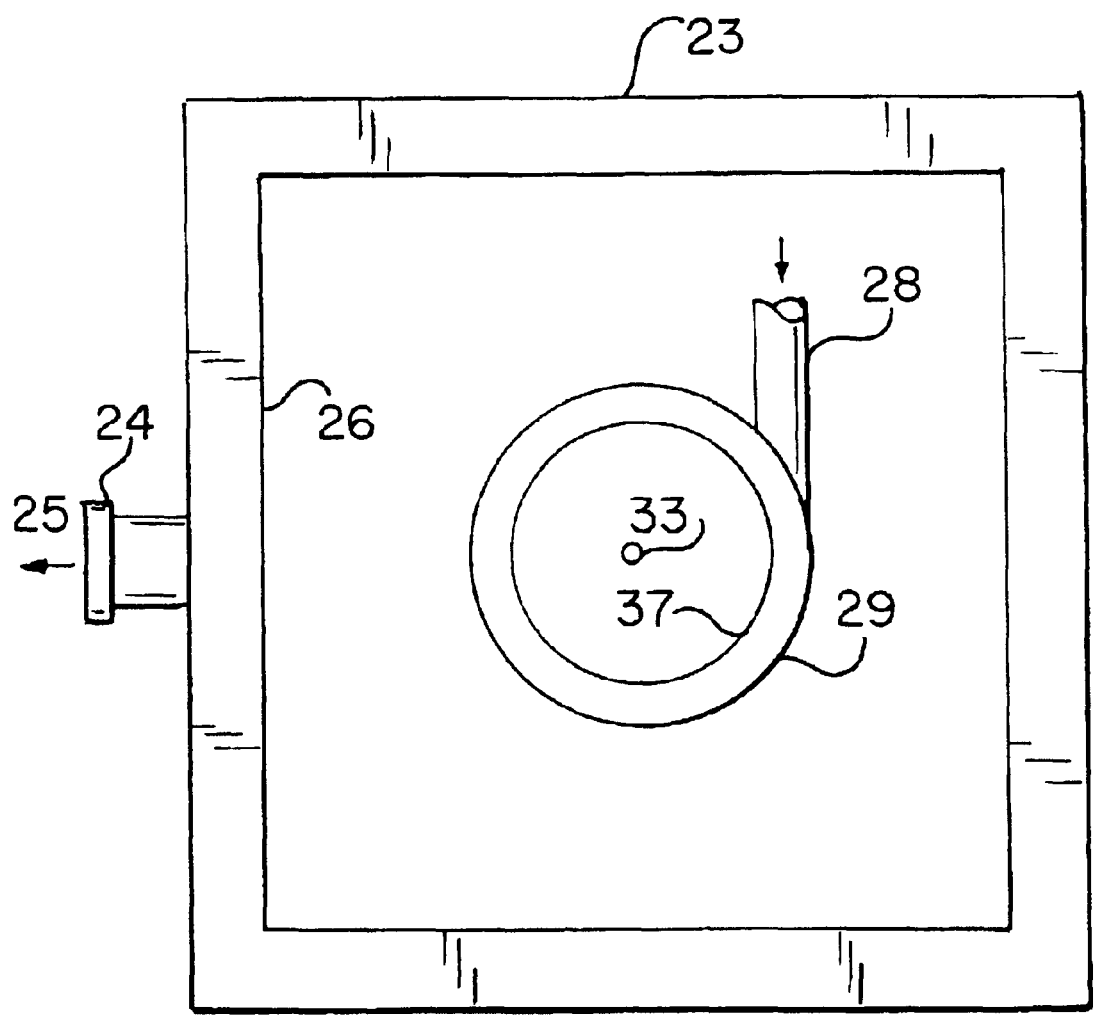
FIG. 6 is a top pictorial view of the separation apparatus of FIG. 1.

The arrangement of feed inlet pipe 28 is illustrated in FIGS. 1 and 6. Pipe 28 is directed downwardly and tangentially into feed well 27 through body 29. The depth that pipe 28 exhausts in feed well 27 is variable with the type of feed being processed. The angle of the pipe 28 from the horizontal is preferably 10°–20° (FIG. 1) to provide a non-horizontal entrance tangential to the flow of teeter water flow 20. The pipe 28 can also enter the feed well vertically and in that case the flow should be directed or turned into a tangential direction by means of baffles or other means as appropriate.

The tangential direction of the inlet pipe 28 into the feed well 27 provides for rotation of the incoming feed which will enhance pre-settling due to centrifugal force applied to the particles of different weights.

In many applications control line 36 is connected between valve 14 and sensor apparatus (not shown) to automatically regulate the level of teeter bed in the chamber 12 of separator 10.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. Apparatus for the pre-separation of hydrous slurry feed in a hindered-bed separator comprising a hindered-bed separator for classifying feed material in a hydrous slurry feed of fines and heavies said separator having an elongated body with an upper part, a middle part and a lower part and a top and bottom defining an interior space with upper, middle, and lower portions, said separator including an overflow launder adjacent said top of said body, a teeter water distributor for introducing teeter water into said lower portion of said interior space and directing water therefrom upwardly into said middle part and thence through said upper part, an elongated feed well for pre-classifying feed material to remove fines from heavies prior to entering into said separator body, said feed well including a housing having an upper portion and a lower portion defining an interior space between an open top and an open bottom an attachment for mounting said housing of said feed well generally spaced equally away from and in said upper portion of said interior space of said body of said separator, an overflow weir mounted adjacent said top portion of said housing adjacent said overflow launder for directing flow of water containing fines through said open top over said weir and into said overflow launder, and a slurry introducer for directing a hydrous slurry feed into said upper portion of said interior space of said feed well and exiting said feed well into said separator at said bottom of said feed well.

2. The apparatus as defined in claim 1 wherein said overflow weir includes an overflow ring body and a plurality of spaced upstanding walls separated by a plurality of spaced slots.

3. The apparatus as defined in claim 2 wherein said slots are V-shaped with a downwardly disposed apex, said walls being V-shaped with an upwardly disposed apex.

4. The apparatus as defined in claim 2 wherein said slots and said walls are substantially rectangular in shape.

5. The apparatus as defined in claim 2 further including a cap portion rotatably mounted to said overflow ring body, said cap portion including a plurality of downwardly subtending alternating walls and slots aligned with said walls and slots of said overflow ring body, said cap portion being rotated to adjust flow from said top portion to said overflow launder.

6. The apparatus as defined in claim 1 further including a flow control plate located adjacent said open bottom of said feed well for controlling flow through said bottom, and means for movably mounting said flow control plate, said means for movably mounting including means for selectively moving said flow control plate vertically with respect to said bottom of said feed well.

7. The apparatus as defined in claim 6 wherein said flow control plate is conical in shape and extends partially into said feed well.

8. The apparatus as defined in claim 6 wherein said means for movably mounting said flow control plate is a threaded rod connected between said flow control plate and said overflow launder.

9. Apparatus for the pre-separation of hydrous slurry feed containing fines and heavies in a hindered-bed separator comprising a hindered-bed separator for classifying feed material in a hydrous slurry feed having an elongated body with an upper part, a middle part, and a lower part and a top and bottom defining an interior space with upper, middle, and lower portions, said separator including an overflow launder adjacent said top of said body and a overflow weir adjacent said overflow launder providing water flow to said overflow launder, a teeter water distributor for introducing teeter water into said lower portion of said interior space and directing water therefrom into said middle and upper parts of said body, an elongated feed well for pre-classifying feed material prior to entering said separator, said feed well including a housing having an upper portion and a lower portion defining an interior space and an open top and an open bottom, means for mounting said housing in said upper portion of said interior space of said body generally equally spaced from said body, said overflow weir being mounted adjacent said top portion of said housing for directing flow through said open top over said weir and into said launder, and a slurry introducer for tangentially directing a hydrous slurry feed into said upper portion of said interior space of said feed well and exiting said feed well into said separator at said bottom of said feed well.

10. The apparatus as defined in claim 9 wherein said overflow weir includes an overflow ring body and a plurality of spaced upstanding walls alternating with a plurality of spaced slots.

11. The apparatus as defined in claim 10 wherein said slots are V-shaped with a downwardly disposed apex, said walls being V-shaped with an upwardly disposed apex.

12. The apparatus as defined in claim 10 wherein said slots and said walls are substantially rectangular in shape.

13. The apparatus as defined in claim 10 further including flow control means rotatably mounted to said overflow ring body.

14. The apparatus as defined in claim 9 further including a flow control plate located adjacent said open bottom of said feed well for controlling flow through said bottom, and means for movably mounting said flow control plate, said means for movably mounting including means for selectively moving said flow control plate vertically with respect to said bottom of said feed well.

15. The apparatus as defined in claim 14 wherein said flow control plate is conical in shape and extends partially into said feed well.

16. The apparatus as defined in claim 14 wherein said means for movably mounting said flow control plate is a threaded rod connected between said flow control plate and said overflow launder.

17. A method for separating particles in a hydrous slurry feed of fines and heavies comprising the steps of:

(A) providing a hindered-bed separator having a teeter water feed flowing upwardly for classifying feed material in a hydrous slurry feed;

(B) providing a feed well having an open top located within the upper portion of the hindered-bed separator of step A and spaced away from the wall defining the separator;

(C) introducing the flow of slurry feed into the feed well tangential to the flow of the teeter feed;

(D) preclassifying the hydrous slurry feed to move water and fines portion therefrom out of the open top of the well to separate such portion from water and heavies portion of the feed slurry exiting from the feed well adjacent its open bottom into the hindered-bed separator; and (E) classifying by the separator the hydrous feed exiting out of the feed well open bottom.

18. The method of claim 17 wherein step B includes the step of:

(F) providing an overflow weir at the top of the feed well to minimize turbulence in the overflow outlet flow from the feed well.

19. The method of claim 18 wherein step C includes the step of:

(G) providing an overflow weir having a body including an alternating series of upstanding spaced walls and slots mounted thereon.

20. The method of claim 19 wherein step F includes the step of:

(H) providing V-shaped slots with the apex thereof disposed downwardly adjacent the body of the overflow ring.

* * * * *